T. W. MOERICKE.
SOLDERING TOOL.
APPLICATION FILED OCT. 26, 1915.
1,234,557.
Patented July 24, 1917.
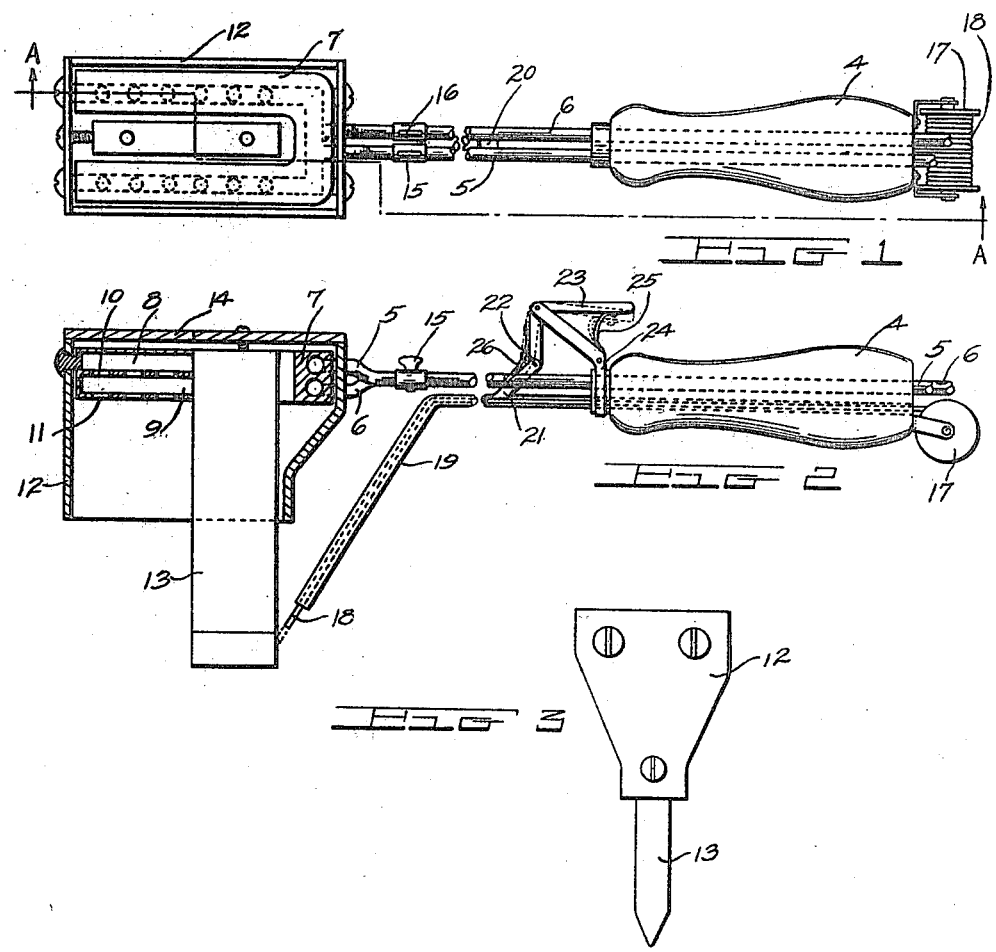

UNITED STATES PATENT OFFICE.

THEODORE W. MOERICKE, OF KENOSHA, WISCONSIN.

SOLDERING-TOOL.

1,234,557. Specification of Letters Patent. Patented July 24, 1917.

Application filed October 26, 1915. Serial No. 58,074.

*To all whom it may concern:*

Be it known that THEODORE W. MOERICKE, citizen of the United States, and resident of Kenosha, in the county of Kenosha and State of Wisconsin, has invented certain new and useful Improvements in Soldering-Tools, of which the following is a specification.

This invention relates to soldering irons and one of the principal objects of the invention is to provide simple, reliable and efficient means for feeding wire solder to the heated soldering iron by utilizing the same hand that holds the soldering iron.

Another object of the invention is to provide a soldering iron which can be effectively applied to the work and which does not require the use of both hands in the process of soldering.

These and other objects may be obtained by means of the construction illustrated in the accompanying drawings, in which, Figure 1 is a plan view of the soldering iron with the furnace cover and solder wire feeding mechanism removed.

Fig. 2 is a partly sectional view on the line A—A.

Fig. 3 is an end view of Fig. 1.

Similar letters of reference refer to similar parts throughout the several views.

Referring to the drawing, the numeral 4 designates a handle through which is conveniently bored a number of holes through which the air tube 5 and the gas tube 6 pass. These tubes terminate in a forked mixing chamber 7, the air tube 5 communicating with the upper compartment 8 of the mixing chamber while the gas tube 6 communicates with the lower compartment 9 of the mixing chamber. The compartment 8 contains outlets 10 which allows the compressed air therein to enter the compartment 9, thoroughly mixing with the gas in compartment 9, the mixture then escaping through the holes 11, at which point it ignites, the resulting flame being largely confined within the furnace wall 12 and practically surrounding the soldering iron 13, thoroughly heating same. 14 is the cover for the furnace 12. An air valve 15 and a gas valve 16 are inserted in the tubes 5 and 6 respectively for adjusting and regulating the supply of air and gas.

A reel 17 is rotatably mounted at the end of the handle 4 as shown, the wire solder 18 being caused to pass through the tube 19, the end always being in close proximity to the soldering iron 13 as plainly illustrated in Fig. 2. A longitudinal aperture 20 in the tube 19 allows the serrated edge of the arm 21 to intermittently grip the wire solder 18 and force the wire forward through the tube as plainly illustrated by the dotted lines. The arm 21 is pivoted at 22 to the lever 23, which in turn is pivoted to the bracket 24. Spring 25 tensions the lever 23 upward from the bracket 24. The spring 26 urges the arm 21 and lever 23 to assume a relatively angular position.

The operation of my device is now as follows: The gas valve 16 is first opened, allowing the gas to enter compartment 9 from whence it escapes through the holes 11, it being here ignited. In order to improve the combustion and to provide heat of greater intensity, the air valve 15 is now opened a sufficient amount, allowing air to enter compartment 8 from whence it escapes through the holes 10 and mixes with the gas in the compartment 9. It will be noted that the holes 10 are located directly above the holes 11 thereby allowing the greater pressure of the air to assist in forcing the gas in compartment 9 directly through the holes 11 and projecting the resulting flame a considerable distance downward and around the soldering iron 13. The heat of the soldering iron will soon melt the end of the wire solder 18 which will be utilized in the work to be done. In order to provide more solder to contact with the soldering iron 13, all that is necessary is to depress the lever 23 with the thumb or finger of the hand grasping the handle 4. As previously explained, this action will advance the wire solder through the tube 19 a short distance, sufficient to bring the solder again into contact with the soldering iron 13, which is quickly melted for use. Releasing the finger from the lever 23 allows the spring 25 to force the lever upward and the gripping arm 21 backward for a new grip on the wire solder. This operation is then repeated as often as desired.

The bracket 24 may be conveniently clamped around the handle 4 as shown.

From the foregoing, it will be obvious that a soldering iron made in accordance with this invention is extremely simple in construction, can be held and operated with one hand, is capable of accomplishing work quickly and neatly, will be durable and efficient for its purpose and will accomplish work without requiring the tiresome practice of utilizing both hands in the process of soldering.

Various changes may be made in the details of construction without departing from the spirit and scope of the invention as defined in the claim:—

What is claimed is:—

The combination with a soldering iron and its handle, of means for intermittently feeding solder to said iron consisting of a tube having one end secured in said handle and its other end free and in close proximity to the soldering iron, a passage in the handle communicating with said tube, a reel of wire solder attached to the outer end of the handle, said solder passing through the passage and tube, a bracket mounted on the inner end of said handle, a bell crank lever pivoted in the bracket, a feeder arm having one end pivoted to one arm of the bell crank lever and its other end serrated and engaging the solder through a slot in said tube, the free arm of said bell crank forming a finger engaging portion adapted to be depressed to feed the solder to said iron, spring means carried by the finger engaging arm for returning the bell crank lever from depressed position to operative position, and spring means carried by said feeder arm and bell crank lever for preventing the slipping of said arm over the solder when the finger engaging arm is depressed, substantially as described.

Signed at Kenosha in the county of Kenosha and State of Wisconsin this 23rd day of October A. D. 1915.

THEODORE W. MOERICKE.

Witnesses:
EDWALD H. NORLANDER,
EDWARD A. KOLE.